United States Patent [19]

Lachman et al.

[11] Patent Number: 5,565,394
[45] Date of Patent: Oct. 15, 1996

[54] LOW EXPANSION MOLECULAR SIEVES AND METHOD OF MAKING SAME

[75] Inventors: Irwin M. Lachman, Corning; Raja R. Wusirika, Painted Post, both of N.Y.

[73] Assignee: Corning Incorporated, Corning, N.Y.

[21] Appl. No.: 320,324

[22] Filed: Oct. 11, 1994

[51] Int. Cl.⁶ .................................................. B01J 29/06
[52] U.S. Cl. .......................... 502/64; 502/67; 502/68; 502/71
[58] Field of Search .................. 502/63, 64, 67, 502/68, 69, 71, 80

[56] References Cited

U.S. PATENT DOCUMENTS

| | | | |
|---|---|---|---|
| 3,312,615 | 4/1967 | Cramer et al. | 208/120 |
| 3,526,322 | 9/1970 | Burroughs et al. | 502/63 |
| 3,609,103 | 9/1971 | Gladrow et al. | 502/68 |
| 4,631,267 | 12/1986 | Lachman et al. | 502/439 |
| 4,637,995 | 1/1987 | DeAngelis et al. | 502/439 |
| 4,778,665 | 10/1988 | Krishnamurthy et al. | 423/239 |
| 4,791,082 | 12/1988 | Dorr et al. | 502/65 |
| 4,800,187 | 1/1989 | Lachman et al. | 502/64 |
| 5,001,097 | 3/1991 | Pecoraro | 502/68 |

FOREIGN PATENT DOCUMENTS

| | | |
|---|---|---|
| 3293038 | 12/1991 | Japan . |
| 655414 | 4/1979 | U.S.S.R. . |

*Primary Examiner*—Michael Lewis
*Assistant Examiner*—Thomas G. Dunn, Jr.
*Attorney, Agent, or Firm*—L. Rita Quatrini

[57] ABSTRACT

Low expansion molecular sieves bodies and method of making them which involves forming a mixture of up to about 40 weight parts of a thermal expansion control component which can be at least one of zircon, feldspar, calcium silicate, talc, steatite, forsterite, kyanite sillimanite, nepheline syenite, glasses, about 10 to 30 weight parts of permanent binder, at least 50 weight parts of molecular sieve, and temporary binder which can be cellulose ethers, cellulose ether derivatives, and combinations thereof, in a vehicle. The mixture is shaped into a green body which is then dried and fired to produce the product body. Among the preferred bodies are zeolites which find use in hydrocarbon adsorption, denox, and three-way catalyst applications.

26 Claims, No Drawings

LOW EXPANSION MOLECULAR SIEVES AND METHOD OF MAKING SAME

This invention relates to a method of making molecular sieve bodies, particularly zeolite bodies from forming mixtures in which expansion control additives are added to the mixtures to produce bodies having low thermal expansions.

BACKGROUND OF THE INVENTION

Zeolites are known to be good catalysts for cracking, three-way catalysis, adsorption of hydrocarbons, denox applications, etc. Zeolites are conveniently extruded into pellets. However, monolithic zeolite honeycombs have come into use because of the high geometric surface area for reaction or adsorption sites combined with low back pressure that is provided by such structures.

For zeolites to be used as monolithic honeycombs and used at high temperatures (>300° C.), these materials need to have sufficient thermal shock resistance. Thermal shock resistance of oxides such as zeolites depends on the coefficient of thermal expansion. The closer the coefficient of thermal expansion is to zero, the more thermally shock resistant is the material.

U.S. Pat. Nos. 4,631,267, 4,637,995, 4,791,082, and 4,778,665 relate to formed zeolites having other phases as permanent binders or additional support phases.

The present invention provides some thermally shock resistant zeolite bodies and method of making them.

SUMMARY OF THE INVENTION

In accordance with one aspect of the invention, there is provided low expansion molecular sieves bodies, preferably zeolites. The bodies are composed of molecular sieve, expansion control component which can be at least one of zircon, feldspar, calcium silicate, talc, steatite, fosterite, kyanite, sillimanite, nepheline syenite, and glasses, and permanent binder.

In accordance with another aspect of the invention, there is provided a method of making the above-described bodies which involves forming a mixture of up to about 40 weight parts of a thermal expansion control component which can be at least one of zircon, feldspar, calcium silicate, talc, steatite, forsterite, kyanite, sillmanite, nepheline syenite, glasses, about 10 to 30 weight parts of permanent binder, at least 50 weight parts of molecular sieve, and temporary binder which can be cellulose ethers, cellulose ether derivatives, and combinations thereof, in a vehicle. The mixture is shaped into a green body which is then dried and fired to produce the product body. Among the preferred bodies are zeolites which find use in hydrocarbon adsorption, denox, and three-way catalyst applications.

DETAILED DESCRIPTION OF THE INVENTION

The present invention provides thermally resistant molecular sieve bodies. The thermal shock resistance or thermal expansion can be controlled by including in the molecular sieve forming mixture one or more components which have the property of altering the thermal expansion properties of the molecular sieve mixtures. Molecular sieve structures and especially zeolites have low or negative thermal expansions, that is, a coefficient of thermal expansion (CTE) of $-20\times10^{-7}$/°C. or even lower over their useful stable temperature ranges. The expansion control component has a higher thermal expansion than the molecular sieve. The expansion control component raises the thermal expansion of molecular sieves mixtures over the useful stable temperature ranges. The mixtures of the present invention and the products produced therefrom therefore have coefficients of thermal expansion (CTE's) which are higher than the CTE's of the molecular sieves without the expansion control component.

The thermally shock resistant molecular sieve bodies of the present invention are made by a method which involves forming a mixture of molecular sieve and at least one thermal expansion control additive or component which can be powdered mineral products as zircon, feldspar, calcium silicate, talc, steatite, forsterite, kyanite, sillimanite, and nepheline syenite, or a prepared product such as glasses in powder form, and mixtures of these, and a permanent binder. Also included in the mixture is a temporary binder. The mixture is carried in a vehicle.

Molecular sieves are crystalline substances having pores of size suitable for adsorbing molecules. The molecular sieve can be as crystallized, in the ammonium form or hydrogen form, or ion-exchanged with or impregnated with a cation. The molecular sieves can be provided in ion exchanged form or impregnated with cations either before forming into a body or after the product body has formed. The ion-exchange and impregnation methods are well known processes. Such treatments are within the scope of this invention. Thermal expansion changes effected by the expansion control component remain within the scope of this invention.

Some types of molecular sieves which are preferred for the practice of the present invention are carbon molecular sieves, zeolites, metallophosphates, silicoaluminophosphates, and combinations of these. Carbon molecular sieves have well defined micropores made out of carbon material.

The molecular sieves that are especially suited to the invention are the zeolites. Preferred zeolites are pentasil, Y, beta, mordenite, X, or mixtures thereof. Especially preferred are ZSM-5, ultrastable Y, (USY) Beta, mordenite, 13X, and mixtures thereof.

Examples of commonly known glasses that can be used as expansion control components, although this list is not all inclusive are soda lime, aluminosilicate, borosilicate, soda barium borosilicate or mixtures of these.

For permanent binders the average particle size is most suitably less than about 0.01 micrometer in diameter. The most suitable permanent binders are silica or transition aluminas such as gamma alumina having that particle size. These can be provided as precursors of silica or alumina.

For example silica precursors such as silicone resin, or colloidal silica are suitable for inclusion in the mixture.

The silicone resin can be any one or combination of silicone resins available commercially today. The preferred resins are crosslinkable silicones containing reactive silanol groups. The silicone resin can be added to the mixture in the form of an aqueous emulsion of silicone in water. Ready prepared emulsions are available commercially. For example, some especially suitable commercial silicone resin emulsions are resin 1-0468 and 1-0469, which are supplied by Dow Corning. Resin 6-2230 from Dow Corning is in powder form and can be added to the mixture with an appropriate solvent such as isopropyl alcohol or pre-dissolved in dibasic ester solvent. All yield about 50% $SiO_2$ on heat-treating.

Alumina used as a permanent binder can also affect the thermal expansion properties of the molecular sieve product by increasing the thermal expansion.

Gamma alumina and other transition alumina precursors are usually boehmite, alpha alumina monohydrate, alumina tri-hydrate, precursors for hydrolyzed alumina, aluminum chlorhydrate, and hydrated aluminas. Mixtures of silica and alumina permanent binders or their precursors can be used.

Also present in the mixture as additional expansion control components can be zirconia, spinel, titania, mullite, cordierite, lithium aluminosilicate, alumina, and mixtures thereof. When alumina is added for the purpose of expansion control, it can have a wider range of particle size than when it is used as a permanent binder. Most typically the alumina expansion control component has an average particle size of about 1 to 100 micrometers in diameter.

Temporary binders are so called because they are removed during heat-treating. The temporary binders are plasticizing organic binders with optional additions of a co-binder.

THE ORGANIC BINDER

The purpose of the organic binder is to provide plasticity during forming, and some green strength after drying. Organic binder according to the present invention refers to cellulose ether type binders and/or their derivatives some of which are thermally gellable. Some typical organic binders according to the present invention are methylcellulose, hydroxybutylcellulose, hydroxybutyl methylcellulose, hydroxyethylcellulose, hydroxymethylcellulose, hydroxypropylcellulose, hydroxypropyl methylcellulose, hydroxyethyl methylcellulose, sodium carboxy methylcellulose, and mixtures thereof. Methylcellulose and/or methylcellulose derivatives are typically used in the practice of the present invention. Methylcellulose, hydroxypropyl methylcellulose, and combinations thereof are especially preferred. Preferred sources of cellulose ethers and/or derivatives thereof, are Methocel® A4M, F4M, and F240M from Dow Chemical Co. Methocel® A4M is a methylcellulose binder having a gel temperature of 50°–55° C., and a gel strength of 5000 g/cm² (based on a 2% solution at 65° C.). Methocel® F4M and F240M are hydroxypropyl methylcellulose.

The co-binder enhances the plasticity of the mixture. Some examples of suitable co-binders are water soluble binders. Polyvinyl alcohol (PVA), or polyvinyl acetate are especially suitable.

The amounts of molecular sieve, and expansion control component in the mixture will be essentially the same as the amounts in the product body.

The amounts of the permanent binders are based on the expected weight after heat-treatment which will be the weight of the binder in the product body. For example when silicone resin or any of the alumina precursors are used the weight of the permanent binder is the weight of silica and alumina respectively.

The amount of temporary binder in the mixture is calculated as a superaddition over the combined weights of molecular sieve, (MS) expansion control component, (EC) and permanent binder (based on as-heated yield) (PB) according to the following formula: formula:

$$\frac{\text{wt. of temporary binder}}{\text{wt. of } MS + EC + PB} \times 100.$$

The mixture is made up of in parts by weight: up to about 40 of the expansion control component, about 5 to 30 of the permanent binder, and at least 50 of the molecular sieve. These amounts are essentially the same as the levels in the product bodies. Typical superadditions of organic binder in the starting mixture are about 2% to about 12%, and preferably about 3% to 8% by weight.

Some possible mixtures are given in the following tables. Table 1 gives mixtures with ZSM-5 zeolite, Table 2 with beta zeolite, and Table 3 with ultrastable Y zeolite. The components are expressed in weight parts.

TABLE 1

| | | | | ZSM-5 Compositions | | | |
|---|---|---|---|---|---|---|---|
| ZSM-5 | Silica | Gamma Alumina | Zircon* | Steatite** | 2MgO.2Al$_2$O$_3$.5SiO$_2$# | 3Al$_2$O$_3$.2SiO$_2$## | LiAl[Si$_2$O$_6$]** |
| 70 | 10 | 0 | 5 | 0 | 15 | 0 | 0 |
| 70 | 10 | 0 | 5 | 0 | 15 | 0 | 0 |
| 70 | 10 | 0 | 5 | 0 | 0 | 15 | 0 |
| 70 | 10 | 0 | 5 | 0 | 0 | 15 | 0 |
| 70 | 10 | 0 | 5 | 0 | 0 | 0 | 15 |
| 70 | 10 | 0 | 5 | 0 | 0 | 0 | 15 |
| 70 | 0 | 10 | 0 | 5 | 15 | 0 | 0 |
| 70 | 0 | 10 | 0 | 5 | 15 | 0 | 0 |
| 70 | 0 | 10 | 0 | 5 | 0 | 15 | 0 |
| 70 | 0 | 10 | 0 | 5 | 0 | 15 | 0 |
| 70 | 0 | 10 | 0 | 5 | 0 | 0 | 15 |
| 70 | 0 | 10 | 0 | 5 | 0 | 0 | 15 |

Silica is from silicone resin
*ZrO$_2$.SiO$_2$
**Steatite = approximately talc = Mg$_6$[Si$_8$O$_{20}$](OH)$_4$
Cordierite ##Mullite
***B-Spodumene = LAS = a lithium aluminosilicate

TABLE 2

Beta Zeolite Compositions

| Beta Zeolite | Silica | Gamma Alumina | Feldspar* | CaSiO₃ | Sillimanite# | ZrO₂ | MgAl₂O₄** | TiO₂ |
|---|---|---|---|---|---|---|---|---|
| 70 | 10 | 0 | 15 | 0 | 0 | 5 | 0 | 0 |
| 70 | 10 | 0 | 15 | 0 | 0 | 5 | 0 | 0 |
| 70 | 10 | 0 | 0 | 15 | 0 | 0 | 5 | 0 |
| 70 | 10 | 0 | 0 | 15 | 0 | 0 | 5 | 0 |
| 70 | 10 | 0 | 0 | 0 | 15 | 0 | 0 | 5 |
| 70 | 10 | 0 | 0 | 0 | 15 | 0 | 0 | 5 |
| 70 | 0 | 10 | 15 | 0 | 0 | 5 | 0 | 0 |
| 70 | 0 | 10 | 15 | 0 | 0 | 5 | 0 | 0 |
| 70 | 0 | 10 | 0 | 15 | 0 | 0 | 5 | 0 |
| 70 | 0 | 10 | 0 | 15 | 0 | 0 | 5 | 0 |
| 70 | 0 | 10 | 0 | 0 | 15 | 0 | 0 | 5 |
| 70 | 0 | 10 | 0 | 0 | 15 | 0 | 0 | 5 |

Silica is from silicone resin
*Approx. feldspar formula (K,Na) [AlSi₃O₈]
Al₂SiO₅
**Spinel

TABLE 3

Ultrastable Y Compositions

| USY Zeolite | Silica | Gamma Alumina | Feldspar* | CaSiO₃ | N.S.# | ZrO₂ | MgAl₂O₄** | TiO₂ |
|---|---|---|---|---|---|---|---|---|
| 70 | 10 | 0 | 15 | 0 | 0 | 5 | 0 | 0 |
| 70 | 10 | 0 | 15 | 0 | 0 | 5 | 0 | 0 |
| 70 | 10 | 0 | 0 | 15 | 0 | 0 | 5 | 0 |
| 70 | 10 | 0 | 0 | 15 | 0 | 0 | 5 | 0 |
| 70 | 10 | 0 | 0 | 0 | 15 | 0 | 0 | 5 |
| 70 | 10 | 0 | 0 | 0 | 15 | 0 | 0 | 5 |
| 70 | 0 | 10 | 15 | 0 | 0 | 5 | 0 | 0 |
| 70 | 0 | 10 | 15 | 0 | 0 | 5 | 0 | 0 |
| 70 | 0 | 10 | 0 | 15 | 0 | 0 | 5 | 0 |
| 70 | 0 | 10 | 0 | 15 | 0 | 0 | 5 | 0 |
| 70 | 0 | 10 | 0 | 0 | 15 | 0 | 0 | 5 |
| 70 | 0 | 10 | 0 | 0 | 15 | 0 | 0 | 5 |

Silica is from silicone resin
*Approx feldspar formula = (K,Na)[AlSi₃O₈]
N.S. = Nepheline syenite; approximate formula: Na₃(Na,K) [Al₄Si₄O₁₆]
**MgAl₂O₄ = Spinel One advantageous mixture consists essentially of in weight parts about 10 to 40 of expansion control component which can be zircon, calcium silicate, or mixtures of these, about 10 to 15 of silica as permanent binder having an average particle size of less than about 0.01 micrometer in diameter, and about 50 to 90 parts of zeolite which can be ZSM-5, ultrastable Y, beta, mordenite, or mixtures of these. The temporary binder can be methylcellulose, methylcellulose derivatives, or combinations of these.

Another advantageous composition consists essentially of in parts by weight about 5 to 25 of calcium silicate, about 10 to 20 gamma alumina as permanent binder having an average particle size of less than about 0.01 micrometer in diameter, and about 50 to 95 of ZSM-5 zeolite. The temporary binder can be methylcellulose, methylcellulose derivatives, or combinations of these.

Another advantageous composition consists essentially of in parts by weight about 10 to 40 feldspar, about 10 to 11 silica as permanent binder having an average particle size of less than about 0.01 micrometers in diameter and about 50 to 90 of ultrastable Y zeolite. Temporary binder can be methylcellulose, methylcellulose derivatives, or combinations of these.

The bodies of the present invention can be used in applications such as in automotive cold start for hydrocarbon adsorption.

Some especially suited bodies are those having the following compositions (that is, made from mixtures having the following compositions, and superadditions of temporary binder which is preferably methylcellulose, methylcellulose derivatives, or combinations of these) expressed in weight parts:

(a) about 75 to 85 of ZSM-5 zeolite, about 8 to 12 calcium silicate, and about 8 to 12 silica binder preferably from silicone resin precursor. The coefficient of thermal expansion (CTE) of this body is about $-5 \times 10^{-7}/°C$. to $5 \times 10^{-7}/°C$. over the range of about 25° C. to 800° C.;

(b) about 65 to 75 of ultrastable Y zeolite, about 3 to 10 of calcium silicate, about 15 to 25 alpha alumina as expansion control component having an average particle size of about 1 to 100 micrometers in diameter, and about 8 to 12 silica as permanent binder having an average particle size of less than about 0.01 micrometer in diameter, preferably from silicone resin precursor. The CTE of this body is about $-5 \times 10^{-7}/°C$. to $-10 \times 10^{-7}/°C$. over the range of about 25° C. to 800° C.; and (c) about 35 to 45 of ZSM-5 zeolite, about 30 to 40 of ultrastable Y zeolite, about 12 to 18 calcium silicate, and about 8 to 15 silica permanent binder having an average particle size of less than about 0.01 micrometer in diameter, preferably from silicone resin precursor. The CTE of this body is about 0 to $-10 \times 10^{-7}$/°C. over the range of about 25° C. to 800° C.

The bodies of the present invention are suited also as catalysts for selective catalytic reduction of $NO_x$ in waste gases. One especially suited body for this application has the following composition (that is, made from mixtures having the following compositions with superadditions of temporary binder which is preferably methylcellulose, methylcellulose derivatives, or combinations of these) expressed in weight parts:

(d) about 80 to 90 of ZSM-5 zeolite, about 3 to 8 of calcium silicate, and about 8 to 12 silica permanent binder having an average particle size of less than about 0.01 micrometer in diameter, from silicone resin precursor. The CTE of this body is about 0 to $-10 \times 10^{-7}$/°C. over the range of about 25° C. to 800° C.

The bodies of the present invention are suited also as catalysts for three-way catalytic conversion applications, that is conversion of $NO_x$, CO, and hydrocarbons emitted in automotive exhaust gas. One especially suited body for this application has the following composition (that is, made from mixtures having the following compositions with superadditions of temporary binder which is preferably methylcellulose, methylcellulose derivatives, or combinations of these) expressed in weight parts:

(e) about 60 to 70 of ZSM-5 zeolite, about 3 to 8 of calcium silicate, about 5 to 10 silica permanent binder, preferably from silicone resin precursor, about 20 to 25 gamma alumina. The silica and gamma alumina have an average particle size of less than about 0.01 micrometer in diameter. The CTE of this body is about 0 to $10 \times 10^{-7}$/°C. over the range of about 25° C. to 800° C. The gamma alumina having this small particle size enhances the catalytic activity of this catalyst.

Some mixtures that have been found to be especially effective in controlling the expansion of zeolites are given in Tables 4–8.

The raw materials of the mixture which are in powder form i.e. the molecular sieve, expansion control materials, binders and/or precursors are first dry mixed.

The vehicle, usually water, is added in amounts sufficient to form a homogeneous formable batch and this is plasticized in a mix muller for example. If a silicone resin is used some or all of the vehicle must be a solvent such as isopropyl alcohol.

The mixture is shaped into a body.

The bodies according to the present invention can have any convenient size and shape. For example, for hydrocarbon adsorption in engine exhaust purification, the preferred shape is a cellular body such as a honeycomb structure.

Some examples of honeycombs produced by the process of the present invention, although it is to be understood that the invention is not limited to these, are those having about 94 cells/cm² (about 600 cells/in²), about 62 cells/cm² (about 400 cells/in²), or about 47 cells/cm² (about 300 cells/in²), about 31 cells/cm² (about 200 cells/in²), about 15 cells/cm² (about 100 cells/in²) or about 1.4 cells/cm² (9 cells/in²). Typical wall (web) thicknesses in catalytic converter applications, for example, are about 6 mils (about 0.15 mm) for 400 cells/in² (62 cells/cm²) honeycombs. Web thicknesses range typically from about 4 to about 35 mils (about 0.1 to about 0.9 mm). The external size and shape of the body is controlled by the application.

The forming can be done by any method that makes use of shaping a powder mixture. The preferred method of forming is by extrusion through a forming die. A ram extruder is typically used, although any extrusion equipment known in the art can be used such as a continuous auger or twin screw extruder.

In forming honeycomb structures, it is preferred to extrude the mixture through a honeycomb die.

If desired, the formed body can be cut into parts of varying sizes.

The resulting formed body is then dried and then heat-treated to convert the binder precursors to permanent binders.

The dried bodies are heated (fired) at a temperature of about 400° C. to 1000° C. to develop strength. The heating temperatures depend on the particular support material. For example, for a zeolite the temperatures are most advantageously about 700° C. to 900° C. The heating times depend on factors such as the temperature, size and shape of the body, etc.

To more fully illustrate the invention, the following non-limiting examples are presented. All parts, portions, and percentages are on a weight basis unless otherwise stated.

EXAMPLES

Zeolite compositions were prepared by dry mixing the raw material powders in an intensive mixer. The raw materials used in these examples are shown in Tables 4 through 9. Tables 4 through 9 give the amounts of powders used as well as the amounts of vehicles used for plasticizing the mixed powders. The powders included the indicated zeolite, the expansion control component, the permanent binder precursor and the temporary binder. After the dry mixing the mixtures were plasticized with the vehicles indicated in each Table. Next the plastic mixtures were each extruded through honeycomb forming dies or rod forming dies. The formed pieces were dried to at least about 95° C. Dried pieces were fired at about 850° C. for about 3 hours. Fired samples were ready for use and for physical property measurements such as CTE. Tables 4A thru 9A show the product compositions of the respective examples in Tables 4 thru 9 along with the CTE's.

TABLE 4

| No. | ZSM-5 [260/1]* gms. | Zircon gms. | Dow-Corning Silicone emulsion 1-0468 gms. | Dow A4M Methyl-cellulose gms, | Water gms, |
| --- | --- | --- | --- | --- | --- |
| 4-1 | 80.0 | 10.0 | 48.0 | 6.0 | 133 |
| 4-2 | 65.0 | 25.0 | 48.0 | 6.0 | 11.7 |
| 4-3 | 50.0 | 40.0 | 48.0 | 6.0 | 5.0 |

*$SiO_2/Al_2O_3$ mole ratio

TABLE 5

| No. | ZSM-5 [450/1]* gms. | $CaSiO_3$ gms. | Dow-Corning Q6-2230 Silicone resin gms. | Dow A4M Methyl-cellulose gms. | Dibasic ester | Water gms |
| --- | --- | --- | --- | --- | --- | --- |
| 5-1 | 80.0 | 10.0 | 21.8 | 6.0 | 16.4 | 20.0 |
| 5-2 | 60.0 | 30.0 | 21.8 | 6.0 | 16.4 | 17.5 |

*$SiO_2/Al_2O_3$ mole ratio

TABLE 6

| No. | ZSM-5 [55/1]* gms. | CaSiO₃ gms. | Vista Chem Boehmite 18N4-81 gms. | Silica from Ludox colloidal SiO₂-gms | Dow A4M Methylcellulose gms | Water gms |
|---|---|---|---|---|---|---|
| 6-1 | 60.0 | 30.0 | 12.5 | 0 | 6.0 | 50.0 |
| 6-2 | 70.0 | 20.0 | 12.5 | 0 | 6.0 | 58.3 |
| 6-3 | 80.0 | 10.0 | 12.5 | 0 | 6.0 | 55.0 |
| 6-4 | 75.0 | 0 | 0 | 62.5 | 6.0 | 32.5 |

*$SiO_2/Al_2O_3$ mole ratio

TABLE 7

| No. | Beta Zeolite [25/1]* gms. | Zircon gms. | Dow-Corning Silicone emulsion 1-0468 gms. | Dow A4M Methylcellulose gms, | Water gms, |
|---|---|---|---|---|---|
| 7-1 | 68.5 | 10.0 | 48.0 | 6.0 | 65.0 |
| 7-2 | 55.6 | 25.0 | 48.0 | 6.0 | 51.7 |
| 7-3 | 42.8 | 40.0 | 48.0 | 6.0 | 35.0 |

*$SiO_2/Al_2O_3$ mole ratio

TABLE 8

| No. | Mordenite Zeolite [20/1]* gms. | Zircon gms. | Dow-Corning Silicone emulsion 1-0468 gms, | Dow A4M Methylcellulose gms. | Water gms. |
|---|---|---|---|---|---|
| 8-1 | 56.2 | 25.0 | 48.0 | 6.0 | 8.3 |
| 8-2 | 43.2 | 40.0 | 48.0 | 6.0 | 1.7 |

*$SiO_2/Al_2O_3$ mole ratio

TABLE 9

| No. | USY [430/1]* gms. | Feldspar gms. | Dow-Corning Silicone emulsion 1-0468 gms. | Dow A4M Methylcellulose gms. | Water gms. |
|---|---|---|---|---|---|
| 9-1 | 75.0 | 15.0 | 48.0 | 6.0 | 76.7 |
| 9-2 | 55.0 | 35.0 | 48.0 | 6.0 | 46.7 |

*$SiO_2/Al_2O_3$ mole ratio

TABLE 4A

| No. | % ZSM-5[260/1]* | % Zircon | % Silica | CTE** |
|---|---|---|---|---|
| 4A-1 | 80 | 10 | 10 | −12 |
| 4A-2 | 65 | 25 | 10 | −5.9 |
| 4A-3 | 50 | 40 | 10 | 2.8 |

*$SiO_2/Al_2O_3$ mole ratio
**$\times 10^{-7}/°C$. over the range 25° C. to 800° C.
Compositions and CTE's after heat-treatment at 850° C./3 hrs.

TABLE 5A

| No. | % ZSM-5[450/1]* | % CaSiO₃ | % SiO₂ | CTE** |
|---|---|---|---|---|
| 5A-1 | 77.9 | 11.1 | 11 | 0.7 |
| 5A-2 | 56.9 | 32.4 | 10.8 | 24 |

*$SiO_2/Al_2O_3$ mole ratio
**$\times 10^{-7}/°C$. over the range 25° C. to 800° C.
Compositions and CTE's after heat-treatment at 850° C./3 hrs.

TABLE 6A

| No. | % ZSM-5[55/1]* | % CaSiO₃ | % gamma alumina | % SiO₂ | CTE** |
|---|---|---|---|---|---|
| 6A-1 | 58.8 | 30.9 | 10.3 | 0 | 14.3 |
| 6A-2 | 69 | 20.7 | 10.3 | 0 | 4 |
| 6A-3 | 79.2 | 10.4 | 10.4 | 0 | −3 |
| 6A-4 | 75 | 0 | 0 | 25 | 14.4 |

*$SiO_2/Al_2O_3$ mole ratio
**$\times 10^{-7}/°C$. over the range 25° C. to 800° C.
Compositions and CTE's after heat-treatment at 850° C./3 hrs.

TABLE 7A

| No. | % Beta[25/1]* | % Zircon | % Silica | CTE** |
|---|---|---|---|---|
| 7A-1 | 80 | 10 | 10 | −19.8 |
| 7A-2 | 65 | 25 | 10 | −14.6 |
| 7A-3 | 50 | 40 | 10 | −5.7 |

*$SiO_2/Al_2O_3$ mole ratio
**$\times 10^{-7}/°C$. over the range 25° C. to 800° C.
Compositions and CTE's after heat-treatment at 850° /3 hrs.

TABLE 8A

| No. | % Mordenite [20/1]* | % Zircon | % Silica | CTE** |
|---|---|---|---|---|
| 8A-1 | 65 | 25 | 10 | −23 |
| 8A-2 | 50 | 40 | 10 | −7.4 |

*$SiO_2/Al_2O_3$ mole ratio
**$\times 10^{-7}/°C$. over the range 25° C. to 800° C.
Compositions and CTE's after heat-treatment at 850° C./3 hrs.

TABLE 9A

| No. | % USY[430/1]* | % Feldspar | % Silica | CTE** |
|---|---|---|---|---|
| A-1 | 75 | 15 | 10 | −15.8 |
| A-2 | 55 | 35 | 10 | −5.6 |

*$SiO_2/Al_2O_3$ mole ratio
**$\times 10^{-7}/°C$. over the range 25° C. to 800° C.
Compositions and CTE's after heat-treatment at 850° C./3 hrs.

It should be understood that while the present invention has been described in detail with respect to certain illustrative and specific embodiments thereof, it should not be considered limited to such but may be used in other ways without departing from the spirit of the invention and the scope of the appended claims.

What is claimed is:

1. A method of making a low expansion monolithic molecular sieve body, said method comprising:

a) forming a mixture comprising up to about 40 weight parts of a thermal expansion control component which comprises at least one of zircon, feldspar, calcium silicate, talc, forsterite, kyanite, sillimanite, nepheline syenite, about 10 to 30 weight parts of permanent binder, at least 50 weight parts of molecular sieve, and cellulose ether temporary binder in a vehicle;

b) shaping the mixture into a monolithic green body;

c) drying the green body; and d) firing the green body to produce a monolithic molecular sieve body.

2. A method of claim 1 wherein the molecular sieve is a zeolite selected from the group consisting of pentasil, Y, beta, mordenite, X, and mixtures thereof.

3. A method of claim 2 wherein the mixture consists essentially of in parts by weight about 75 to 85 of ZSM-5 zeolite, about 8 to 12 calcium silicate, and about 8 to 12 silica binder having an average particle size of less than about 0.01 micrometer in diameter, and temporary binder selected from the group consisting of methylcellulose, methylcellulose derivatives, and combinations thereof.

4. A method of claim 2 wherein the mixture consists essentially of in parts by weight about 35 to 45 of ZSM-5 zeolite, about 30 to 40 of ultrastable Y zeolite, about 12 to 18 calcium silicate, and about 8 to 15 silica having an average particle size of less than about 0.01 micrometer in diameter, and temporary binder selected from the group consisting of methylcellulose, methylcellulose derivatives, and combinations thereof.

5. A method of claim 2 wherein the mixture consists essentially of in parts by weight about 80 to 90 of ZSM-5 zeolite, about 3 to 8 of calcium silicate, and about 8 to 12 silica having an average particle size of less than about 0.01 micrometer in diameter, and temporary binder selected from the group consisting of methylcellulose, methylcellulose derivatives, and combinations thereof.

6. A method of claim 2 wherein the mixture consists essentially of in parts by weight about 60 to 70 of ZSM-5 zeolite, about 3 to 8 of calcium silicate, and about 5 to 10 silica, about 20 to 25 gamma alumina, the particle size of the silica and gamma alumina being less than about 0.01 micrometers in diameter, and temporary binder selected from the group consisting of methylcellulose, methylcellulose derivatives, and combinations thereof.

7. A method of claim 2 wherein the mixture consists essentially of in parts by weight about 10 to 40 expansion control component selected from the group consisting of zircon, calcium silicate, and combinations thereof, about 10 to 15 of silica having an average particle size of less than about 0.01 micrometer in diameter as permanent binder, and about 50 to 90 of zeolite selected from the group consisting of ZSM-5, ultrastable Y, beta, mordenite, and combinations thereof, and temporary binder selected from the group consisting of methylcellulose, methylcellulose derivatives, and combinations thereof.

8. A method of claim 2 wherein the mixture consists essentially of in parts by weight about 5 to 25 calcium silicate, about 10 to 20 gamma alumina having an average particle size of less than about 0.01 micrometer in diameter as permanent binder, and about 50 to 95 of ZSM-5 zeolite, and temporary binder selected from the group consisting of methylcellulose, methylcellulose derivatives, and combinations thereof.

9. A method of claim 2 wherein the mixture consists essentially of in parts by weight about 10 to 40 feldspar, about 10 to 11 silica having an average particle size of less than about 0.01 micrometer in diameter as permanent binder, and about 50 to 90 of ultrastable Y zeolite, and temporary binder selected from the group consisting of methylcellulose, methylcellulose derivatives, and combinations thereof.

10. A method of claim 1 wherein the mixture contains an additional expansion control component selected from the group consisting of zirconia, spinel, titania, cordierite, mullite, lithium aluminosilicates, alumina, and mixtures thereof.

11. A method of claim 10 wherein the mixture consists essentially of in parts by weight about 65 to 75 of ultrastable Y zeolite, about 3 to 10 of calcium silicate, about 15 to 25 alpha alumina having an average particle size of about 1 to 100 micrometers in diameter, and about 8 to 12 silica having an average particle size of less than about 0.01 micrometer in diameter, and temporary binder selected from the group consisting of methylcellulose, methylcellulose derivatives, and combinations thereof.

12. A method of claim 1 wherein the mixture contains about 10 to 30 weight parts of permanent binder selected from the group consisting of silica having an average particle size of less than about 0.01 micrometer in diameter, alumina having an average particle size of less than about 0.01 micrometer in diameter, and mixtures thereof.

13. A method of claim 12 wherein silica is the permanent binder and is provided in the mixture in the form of a silicone resin as a silica precursor.

14. A method of claim 1 wherein the mixture is shaped by extrusion.

15. A method of claim 14 wherein the mixture is extruded into a honeycomb structure.

16. A method of claim 1 wherein the mixture is shaped into a honeycomb.

17. A molecular sieve body produced by the method of claim 1.

18. A molecular sieve body produced by the method of claim 7.

19. A molecular sieve body produced by the method of claim 8.

20. A molecular sieve body produced by the method of claim 9.

21. A zeolite body comprising in weight parts about 75 to 85 of ZSM-5 zeolite, about 8 to 12 calcium silicate, and about 8 to 12 silica binder having an average particle size of less than about 0.01 micrometer in diameter, and having a coefficient of thermal expansion of about $-5 \times 10^{-7}$/°C. to $5 \times 10^{-7}$/°C. over the range of about 25° C. to 800° C.

22. A zeolite body comprising in weight parts about 65 to 75 of ultrastable Y zeolite, about 3 to 10 of calcium silicate, about 15 to 25 alpha alumina having an average particle size of about 1 to 100 micrometers in diameter, and about 8 to 12 silica having an average particle size of less than about 0.01 micrometer in diameter, and having a coefficient of thermal expansion of about $-5 \times 10^{-7}$ to $-10 \times 10^{-7}$ over the range of about 25° C. to 800° C.

23. A zeolite body comprising in weight parts about 35 to 45 of ZSM-5 zeolite, about 30 to 40 of ultrastable Y zeolite, about 12 to 18 calcium silicate, and about 8 to 15 silica having an average particle size of less than about 0.01 micrometer in diameter, and having a coefficient of thermal expansion of about 0 to $-10 \times 10^{-7}$/°C. over the range of about 25° C. to 800° C.

24. A zeolite body comprising in weight parts about 85 to 90 of ZSM-5 zeolite, about 3 to 8 of calcium silicate, and about 8 to 12 silica having an average particle size of less than about 0.01 micrometer in diameter, and having a coefficient of thermal expansion of about 0 to $-10 \times 10^{-7}$/°C. over the range of about 25° C. to 800° C.

25. A zeolite body comprising in weight parts about 60 to 70 of ZSM-5 zeolite, about 3 to 8 of calcium silicate, and about 5 to 10 silica, about 20 to 25 gamma alumina, the particle size of the silica and gamma alumina being less than about 0.01 micrometers in diameter, and having a coefficient of thermal expansion of about 0 to $10 \times 10^{-7}$/°C. over the range of about 25° C. to 800° C.

26. A method of making a low expansion monolithic molecular sieve body, said method comprising:

a) forming a mixture comprising up to about 40 weight parts of a thermal expansion control component which comprises at least one of zircon, feldspar, calcium silicate, talc, forsterite, kyanite, sillimanite, nepheline syenite, about 10 to 30 weight parts of permanent binder, at least 50 weight parts of molecular sieve, and cellulose ether temporary binder in a vehicle;

b) shaping the mixture into a monolithic green body;

c) drying the green body; and d) firing the green body to produce a monolithic molecular sieve body having a coefficient of thermal expansion of greater than about $-20 \times 10^{-7}/°C$. over the range of about 25° C. to 800° C.

* * * * *